(12) United States Patent
Chien et al.

(10) Patent No.: US 10,048,794 B2
(45) Date of Patent: Aug. 14, 2018

(54) TOUCH DISPLAY PANEL

(71) Applicant: InnoLux Corporation, Miao-Li County (TW)

(72) Inventors: Charles Chien, Miao-Li County (TW); Chia-Wei Pan, Miao-Li County (TW); Ming-Huang Chen, Miao-Li County (TW); Hsiu-Ting Hsu, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 53 days.

(21) Appl. No.: 14/808,427

(22) Filed: Jul. 24, 2015

(65) Prior Publication Data

US 2016/0026328 A1  Jan. 28, 2016

(30) Foreign Application Priority Data

Jul. 28, 2014 (TW) .............................. 103125738 A (51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0412; G06F 3/0416; G06F 3/044
See application file for complete search history.

(56) References Cited

U.S. PATENT DOCUMENTS

| | | | |
|---|---|---|---|
| 2012/0050193 A1* | 3/2012 | Noguchi | G06F 3/0412 345/173 |
| 2013/0222297 A1* | 8/2013 | Adachi | G06F 3/041 345/173 |
| 2013/0285975 A1* | 10/2013 | Hong | G06F 3/044 345/174 |
| 2014/0139459 A1 | 5/2014 | Wu | |

FOREIGN PATENT DOCUMENTS

TW            M447541 U       2/2013

* cited by examiner

*Primary Examiner* — Insa Sadio
(74) *Attorney, Agent, or Firm* — Muncy, Geissler, Olds & Lowe, P.C.

(57) ABSTRACT

A touch display panel comprises a display module and a sensing electrode layer. The sensing electrode layer is disposed on the substrate of the display module and includes first sensing electrodes, second sensing electrode and wires. The first sensing electrodes are arranged along a longitudinal direction. The second sensing electrode is extended along the longitudinal direction and disposed beside the first sensing electrodes. The wires are electrically connected with the first sensing electrodes and include a plurality of wire segments which are extended alternately along a first extending direction and a second extending direction. The first sensing electrode includes a plurality of first slits, the first slits are extended along the first extending direction, the second extending direction or the combination thereof.

9 Claims, 11 Drawing Sheets

TOUCH DISPLAY PANEL

CROSS REFERENCE TO RELATED APPLICATIONS

This Non-provisional application claims priority under 35 U.S.C. § 119(a) on Patent Application No(s). 103125738 filed in Taiwan, Republic of China on Jul. 28, 2014, the entire contents of which are hereby incorporated by reference.

BACKGROUND OF THE INVENTION

Field of Invention

The present invention relates to a touch display panel.

Related Art

Recently with the colorful and large-scale tendency of the liquid crystal display (LCD) device, the LCD device has been applied to more products, such as smart phones, notebook computers, desktop computers and TVs. Because the LCD module is a non-self-luminous display device, it achieves the display function by controlling the passing of the light emitted by a light source. Therefore, the LCD device requires a corresponding backlight or front light module, which can emit the light to the display panel to achieve the display function.

Figure 1:
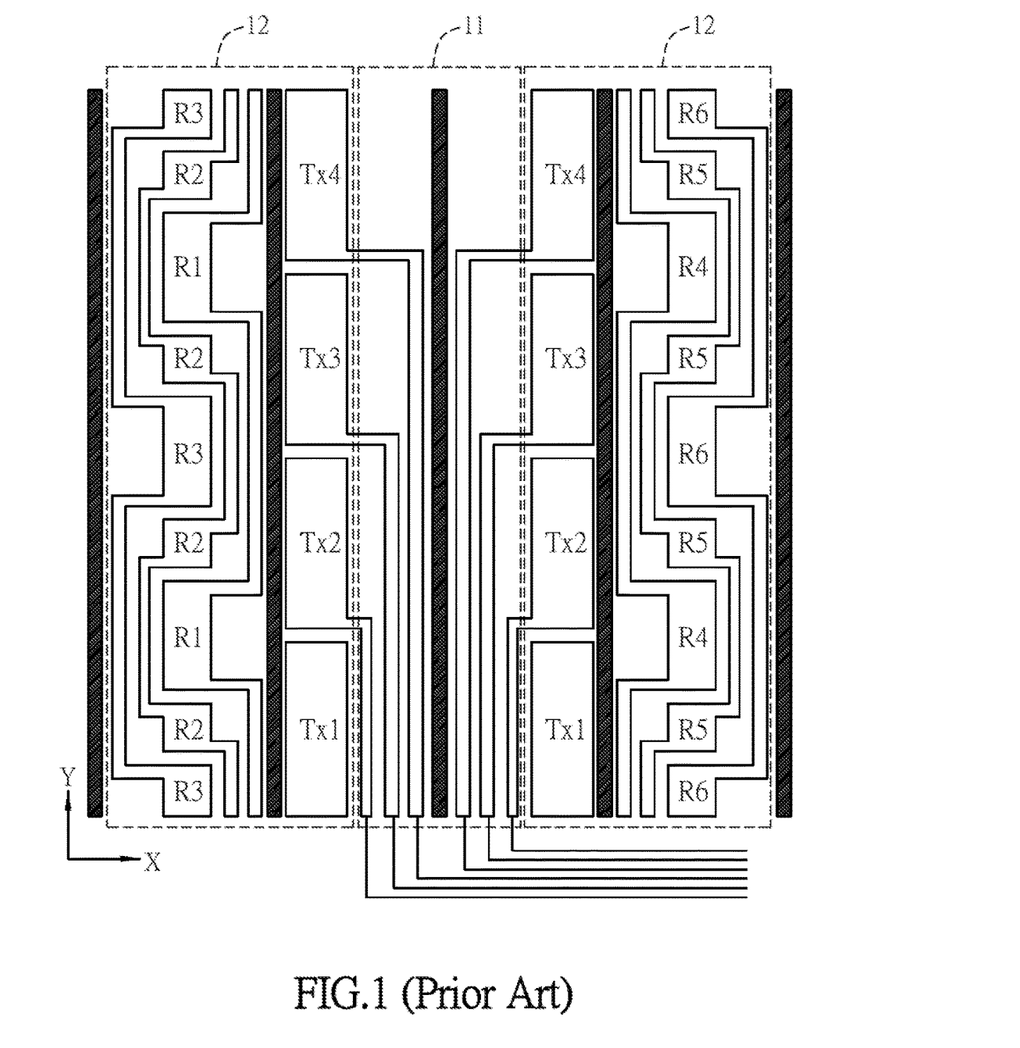
FIG. 1 is a schematic diagram of a conventional sensing electrode layer.

Usually, the LCD device is configured with the touch function, which can be divided into an in-cell type and an on-cell type according to the disposition of the touch panel. A conventional in-cell type of touch control is to form a conductive material on the color filter substrate of the LCD device by sputtering and then form a sensing electrode layer 1 by the subsequent pattern process. Refer to FIG. 1, which is a schematic diagram of a conventional sensing electrode layer 1.

In general, the sensing electrode layer 1 includes a plurality of touch sensing electrode regions 12 and circuit integration regions 11 which are disposed alternately and on the same plane. The touch sensing electrode region 12 includes a plurality of touch sensing electrode groups, each of which includes a plurality of first sensing electrodes and a plurality of second sensing electrodes. The first sensing electrodes (marked by Tx1, Tx2, Tx3, Tx4 in the figure) disposed along the Y direction, and the second sensing electrodes (marked by R1, R2, R3, R4, R5, R6) are extended along the Y direction. The device can determine the touch position of the sensing electrode layer 1 to achieve the detection of the two-dimensional touch signal by the signals received by the firs sensing electrodes and second sensing electrodes.

Furthermore, the connecting wires disposed on a side of the first sensing electrodes will form the circuit integration region 11, which will form a visual dark zone due to a dense arrangement of the connecting wires, whereas the first sensing electrodes and the second sensing electrodes form a visual bright zone due to a not dense arrangement thereof. Accordingly, a plurality of bright and dark zones occur alternately, and therefore the display panel will have an uneven brightness problem after turned on.

Therefore, it is an important subject to provide a touch display panel whereby the display effect can be improved and the uneven brightness problem can be solved.

SUMMARY OF SOME EMBODIMENTS OF THE INVENTION

An objective of the disclosure is to provide a touch display panel whereby the display effect can be improved and the uneven brightness problem can be solved.

To achieve the above objective, the touch display panel of this disclosure comprises a display module and a sensing electrode layer. The display module includes a substrate. The sensing electrode layer is disposed on the substrate.

The sensing electrode layer includes a plurality of first sensing electrodes, second sensing electrode and a plurality of wires. The first sensing electrodes are arranged along a longitudinal direction. The second sensing electrode are extended along the longitudinal direction and disposed beside the first sensing electrodes. The wires are electrically connected with the first sensing electrodes and each of the wires includes a plurality of wire segments connected with each other and extended alternately along a first extending direction and a second extending direction.

The first sensing electrode includes a plurality of first slits. The first slits are extended along the first extending direction, the second extending direction or the combination thereof. Some of the wire segments and some of the first slits are arranged along a transverse row, and the extending direction of some of the first slits arranged along the transverse row is different from that of some of the wire segments arranged along the transverse row.

As mentioned above, in this disclosure, a plurality of first slits are formed on the first sensing electrode. Thereby, the contrast of the brightness and darkness between the sensing electrode region and the circuit integration region of the touch display panel can be lowered down. Therefore, this disclosure can provide a touch display panel whereby the display performance can be improved and the influence of the Moiré interference fringes can be reduced.

BRIEF DESCRIPTION OF THE DRAWINGS

The present invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

To be noted, the following embodiments of the invention are just for the illustrative purpose but not for showing the real dimensions and size ratio.

Figure 2:
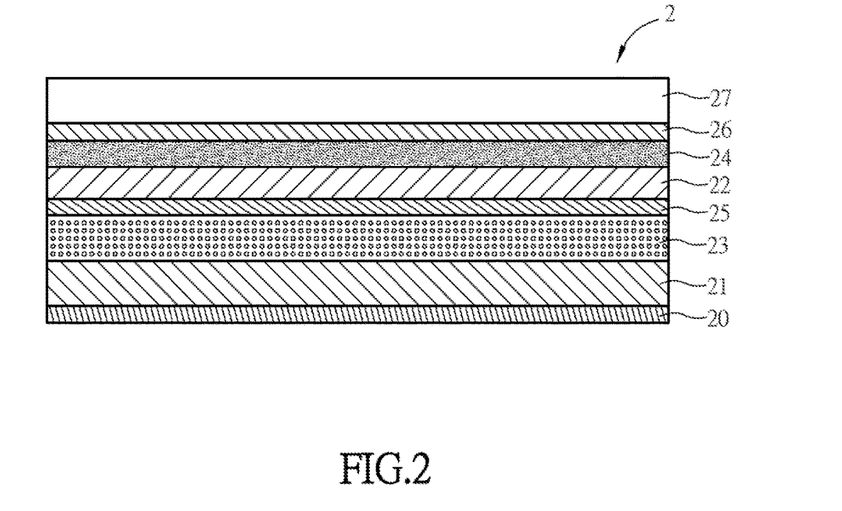
FIG. 2 is a schematic sectional diagram of a touch display panel of the first embodiment of the disclosure.
Figure 3:
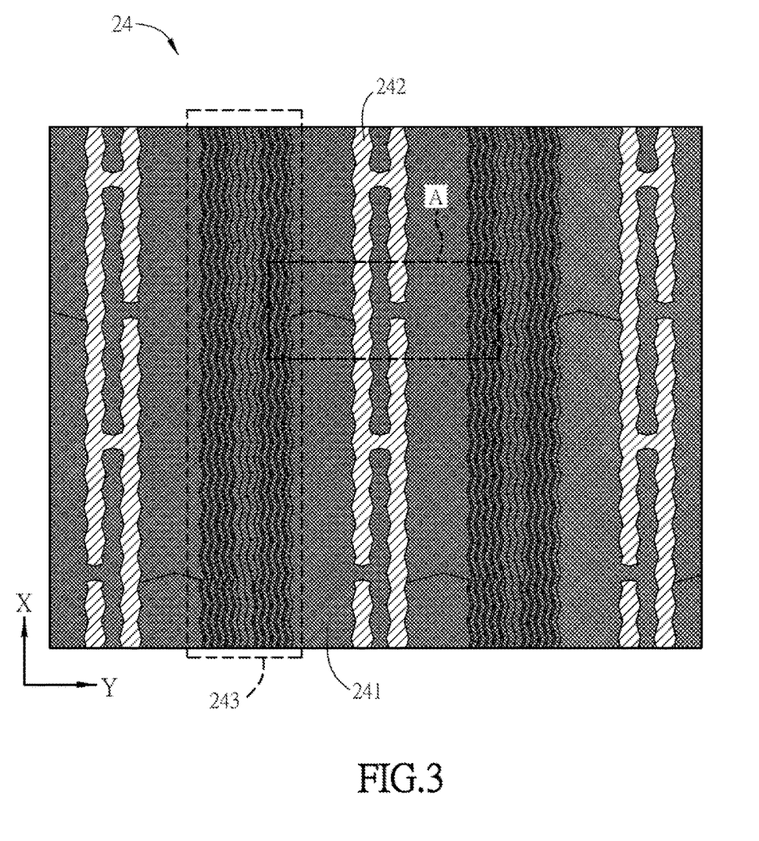
FIG. 3 is a schematic enlarged diagram of a part of the sensing electrode layer in FIG. 2.
Figure 4:
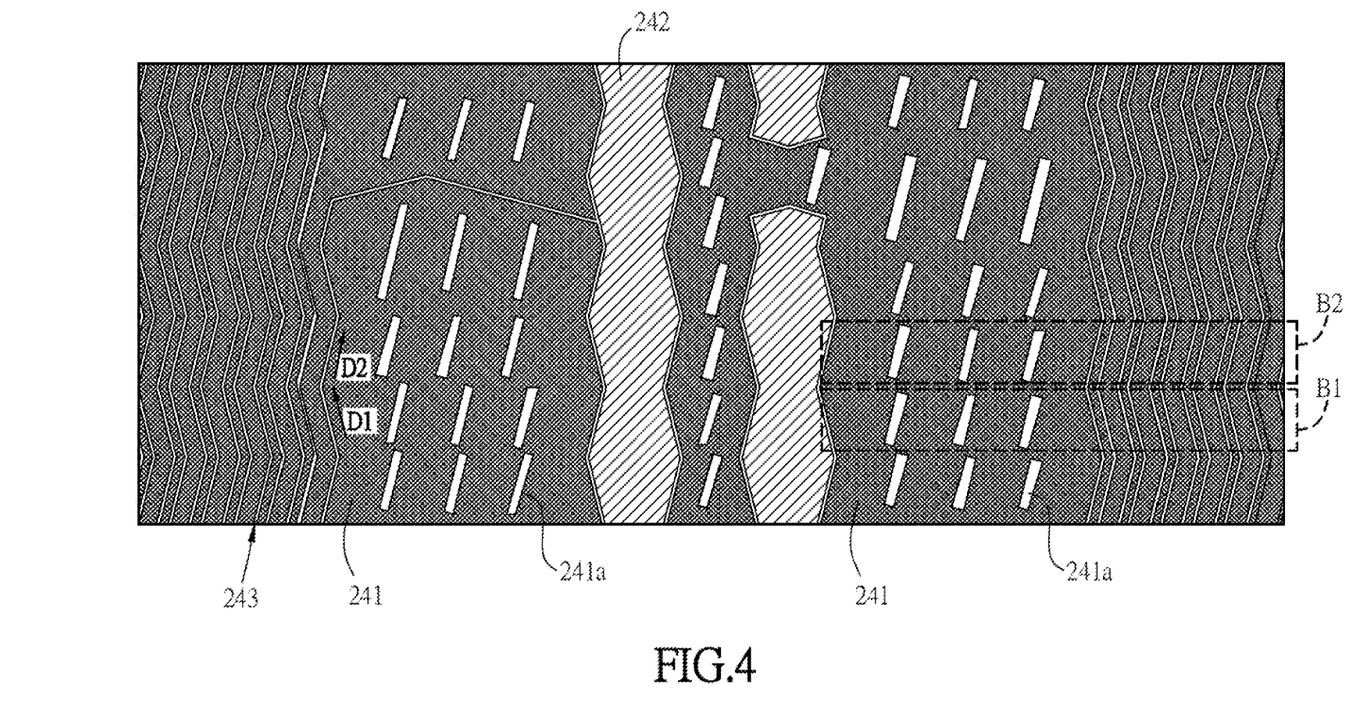
FIG. 4 is a schematic enlarged diagram of the region A in FIG. 3.

FIG. 2 is a schematic sectional diagram of a touch display panel of the first embodiment of the disclosure, FIG. 3 is a schematic enlarged diagram of a part of the sensing electrode layer in FIG. 2, and FIG. 4 is a schematic enlarged diagram of the region A in FIG. 3.

As shown in FIGS. 2 to 4, the touch display panel 2 of this embodiment includes a display module and a sensing electrode layer. The display module includes a first substrate 21 and a second substrate 22 which are disposed oppositely. The sensing electrode layer 24 is disposed on the second substrate 22.

As shown in FIG. 2, the display module sequentially includes, from bottom to top, a first polarization plate 20, the first substrate 21, a display medium 23, a color filter layer 25, the second substrate 22, the sensing electrode layer 24, a second polarization plate 26 and a protection cover 27. However, this disclosure is not limited thereto, and those skilled in the art can comprehend that some layer structure can be added or removed according to the requirement.

The first substrate 21 includes a patterned conductive layer (not shown), and the patterned conductive layer can define a pixel matrix. The pixel matrix is arranged in a matrix and each row of the pixel matrix includes a plurality of pixel areas. Moreover, those skilled in the art can comprehend that the patterned conductive layer may further include scan lines, data liens, thin film transistors and pixel electrodes for example.

The second substrate 22 is a transparent substrate, such as a plastic substrate or a glass substrate. Certainly, the second substrate 22 also may be a polyimide (PI) or polyethylene terephthalate (PET) substrate or another transparent substrate. Besides, the second substrate 22 can be a film-like substrate to have flexibility. In other words, the second substrate 22 can be a hard substrate or a flexible substrate.

The display medium 23 is disposed between the first substrate 21 and the second substrate 22. The display medium 23 can be liquid crystal material for example, and the LCD panel will be taken in the following illustration for example. However, those skilled in the art can comprehend that other kinds of the touch display panel also can be applied.

The first polarization plate 20 of this embodiment is disposed on the side of the first substrate 21 farther from the display medium 23. The second polarization plate 26 is disposed on the side of the second substrate 22 farther from the display medium 23. The protection cover 27 is disposed on the uppermost layer of the touch display panel 2 to protect the inner components of the touch display panel 2 from being affected by the external moisture or dust.

The touch display panel 2 of this embodiment can further include the color filter layer 25 disposed between the second substrate 22 and the display medium 23. The color filter layer 25 includes a plurality of color filter units (not shown), which can be the combination of red color filter film, green color filter film and blue color filter film. In other embodiments, the color filter layer 25 can have the combination of other color filter films, as long as the full color display effect can be achieved.

In order to facilitate the illustration, the size relation (ratio) and disposition of the components shown in FIG. 3 are just for the illustrative purpose but not for showing the real ones. Moreover, the quantities of the first sensing electrodes 241 and second sensing electrodes 242 of the sensing electrode layer 24 of this embodiment are just for the illustrative purpose but not for limiting the scope of this disclosure. In practice, the quantities of the first sensing electrodes 241 and second sensing electrodes 242 can be adjusted according to the product requirement and circuit design.

The sensing electrode layer 24 is disposed beside the second substrate 22. In this embodiment, the sensing electrode layer 24 is disposed on the side of the second substrate 22 farther from the first substrate 21 (i.e. on the upper surface of the second substrate 22). However, this disclosure is not limited thereto.

The sensing electrode layer 24 includes a plurality of first sensing electrodes 241, second sensing electrodes 242 and wires 243 (in FIG. 3). The first sensing electrodes 241 are arranged along the longitudinal direction (X direction), and the second sensing electrodes 242 are extended along the longitudinal direction (X direction) and disposed beside the first sensing electrodes 241. The wires 243 are electrically connected with the first sensing electrodes 241.

The first sensing electrode 241 is made of transparent material, such as indium tin oxide (ITO) or indium zinc oxide (IZO).

The sensing electrode layer 24 continuously transmits the driving signals Tx through the first sensing electrodes 241 and receives the sensing signals Rx through the second sensing electrodes 242. Therefore, when the user touches the touch display panel 2, the sensing signals Rx will be varied so that the user's touch position on the touch display panel 2 can be determined.

Then, refer to FIG. 4. In order to facilitate the illustration, a first extending direction D1 and a second extending direction D2 are further defined in this embodiment, and the first extending direction D1 is different from the second extending direction D2.

The wires 243 include a plurality of wire segments which are connected with each other and extended alternately along the first extending direction D1 and the second extending direction D2. Accordingly, in this embodiment, the wires 243 can be formed into a zigzag pattern, but this disclosure is not limited thereto.

The first sensing electrode 241 includes a plurality of first slits 241a. The first slits 241a of this embodiment are extended along the second extending direction D2. Moreover, the first slits 241a of this embodiment are evenly disposed on the first sensing electrode 241 and all the first slits 241a are extended along the same extending direction. In this embodiment, the wire segments and the first slits 241a are arranged along a plurality of transverse rows, and the distance between the two adjacent first slits 241a arranged along one of the transverse rows is greater than that between the two adjacent wire segments arranged along the one of the transverse rows. To be noted, the quantity and density of the first slits 241a are not limited to the pattern in FIG. 4.

From the region B1 in FIG. 4, it can be seen that the extending direction of some of the first slits 241a arranged along the first transverse row is different from the extending direction of some of the wire segments arranged along the first transverse row. Herein, the first slits 241a are extended along the second extending direction D2, and the wire segments of the wires 243 are extended along the first extending direction D1. However, the region B2 in FIG. 4 shows another case, wherein the extending direction of some of the first slits 241a arranged along the second transverse row is the same as the extending direction of some of the wire segments of the wires 243 arranged along the second transverse row. In other words, the first slits 241a and the wire segments of the wires 243 are both extended along the second extending direction D2.

For the both above cases, the first slits 241*a* are disposed on the first sensing electrode 241 to simulate the densely arranged wires 243. Therefore, the brightness corresponding to the first sensing electrode 241 will approximate the brightness corresponding to the region of the densely arranged wires 243, so that the contrast between the first sensing electrodes 241 (bright zone) and the wires 243 (dark zone) of the touch display panel 2 will be lowered down and the display performance of the touch display panel 2 can be thus improved.

Figure 5:
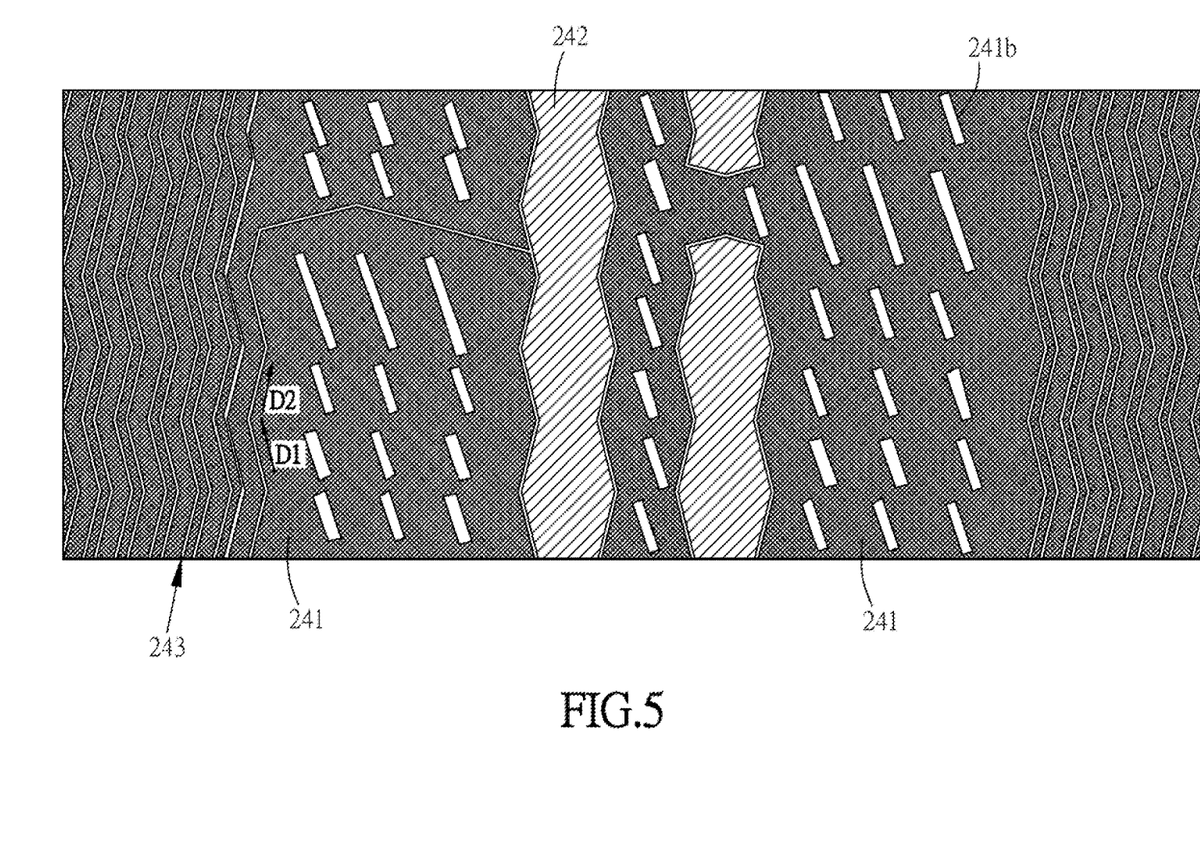
FIG. 5 is a schematic enlarged diagram of the sensing electrode layer of the second embodiment of the disclosure.

FIG. 5 is a schematic enlarged diagram of the sensing electrode layer of the second embodiment of the disclosure. As shown in FIG. 5, the main difference from the above embodiment is that the first slits 241*b* of this embodiment are extended along the first extending direction D1 and all the first slits 24 1b are extended along the same extending direction. Accordingly, the similar effectiveness to the above embodiment also can be achieved.

Since other configurations are similar to the above embodiment, the related illustrations are omitted here for conciseness.

Figure 6:
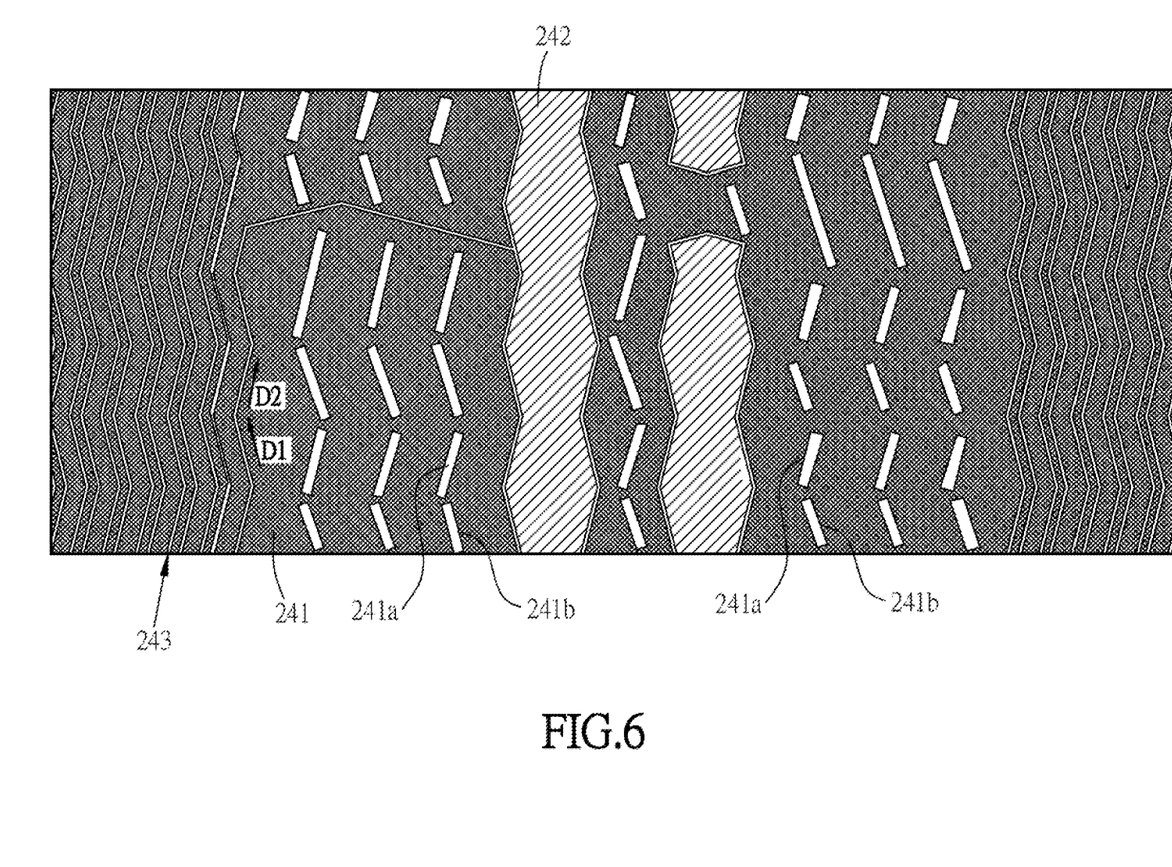
FIG. 6 is a schematic enlarged diagram of the sensing electrode layer of the third embodiment of the disclosure.

Then, refer to FIG. 6, which is a schematic enlarged diagram of the sensing electrode layer of the third embodiment of the disclosure.

As shown in FIG. 6, the main difference from the above two embodiments is that the first slits of this embodiment are extended along the first extending direction and second extending direction, and the first slits 241*a* and 241*b* arranged along the different transverse rows are extended alternately along the first extending direction D1 and the second extending direction D2 so as to form a geometric pattern that is opposite to the pattern of the extending directions of the wires 243.

In detail, this embodiment includes the first slits 241*b* extended along the first extending direction D1 and the first slits 241*a* extended along the second extending direction D2.

Through such disposition, the regulation of the occurrence of the wires 243, first slits 241*a* and first slits 241*b* can be disarranged and the whole visual effect can be thus enhanced.

Since other configurations are similar to the above embodiment, the related illustrations are omitted here for conciseness.

Figure 7:
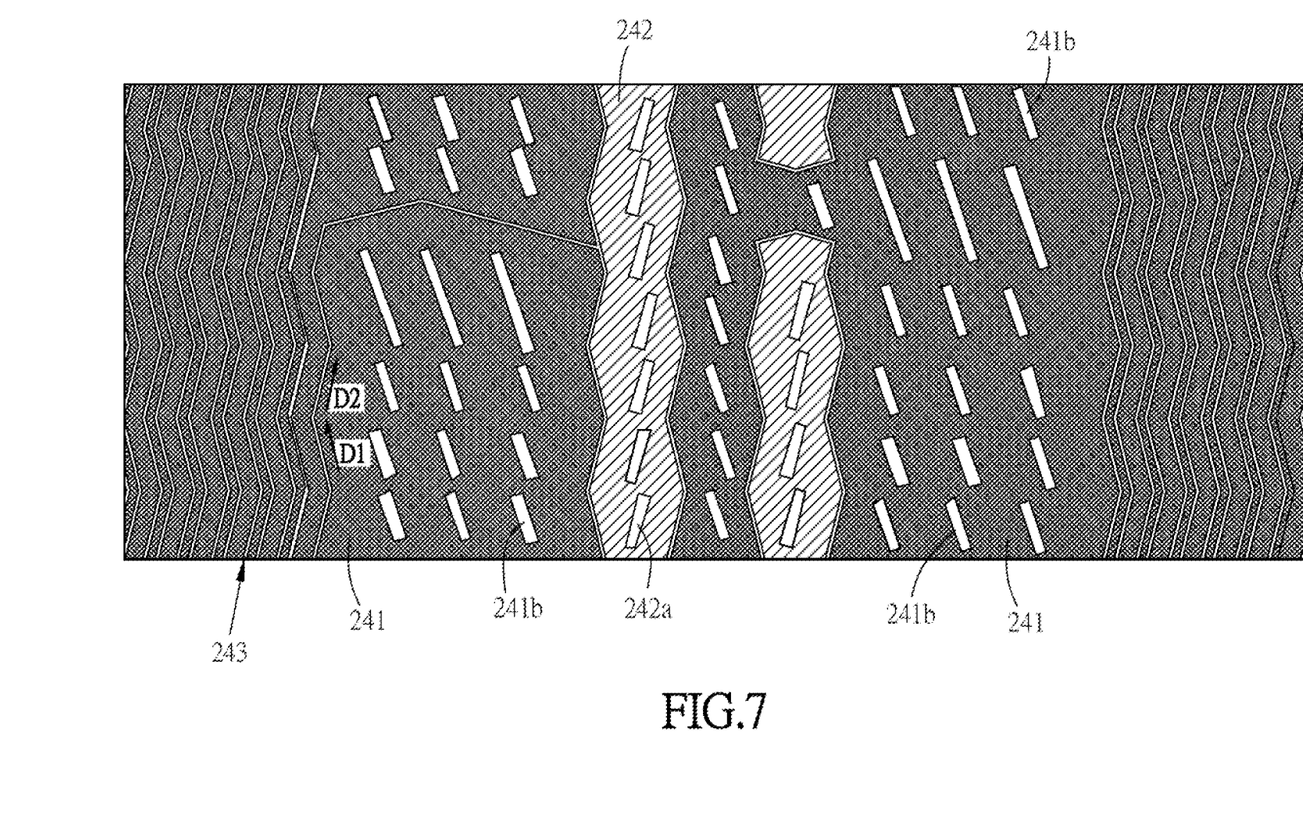
FIG. 7 is a schematic enlarged diagram of the sensing electrode layer of the fourth embodiment of the disclosure.
Figure 8:
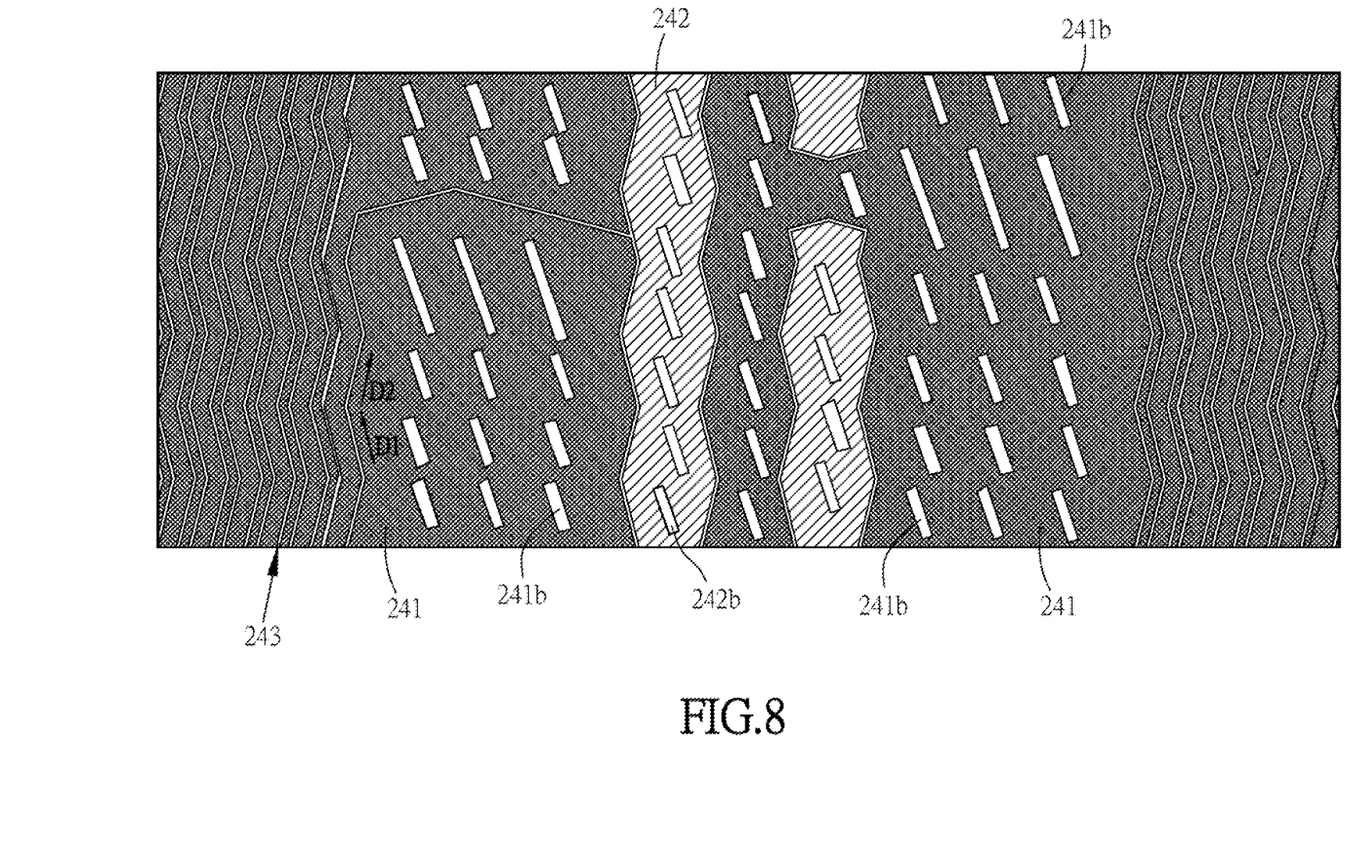
FIG. 8 is a schematic enlarged diagram of the sensing electrode layer of the fifth embodiment of the disclosure.
Figure 9:
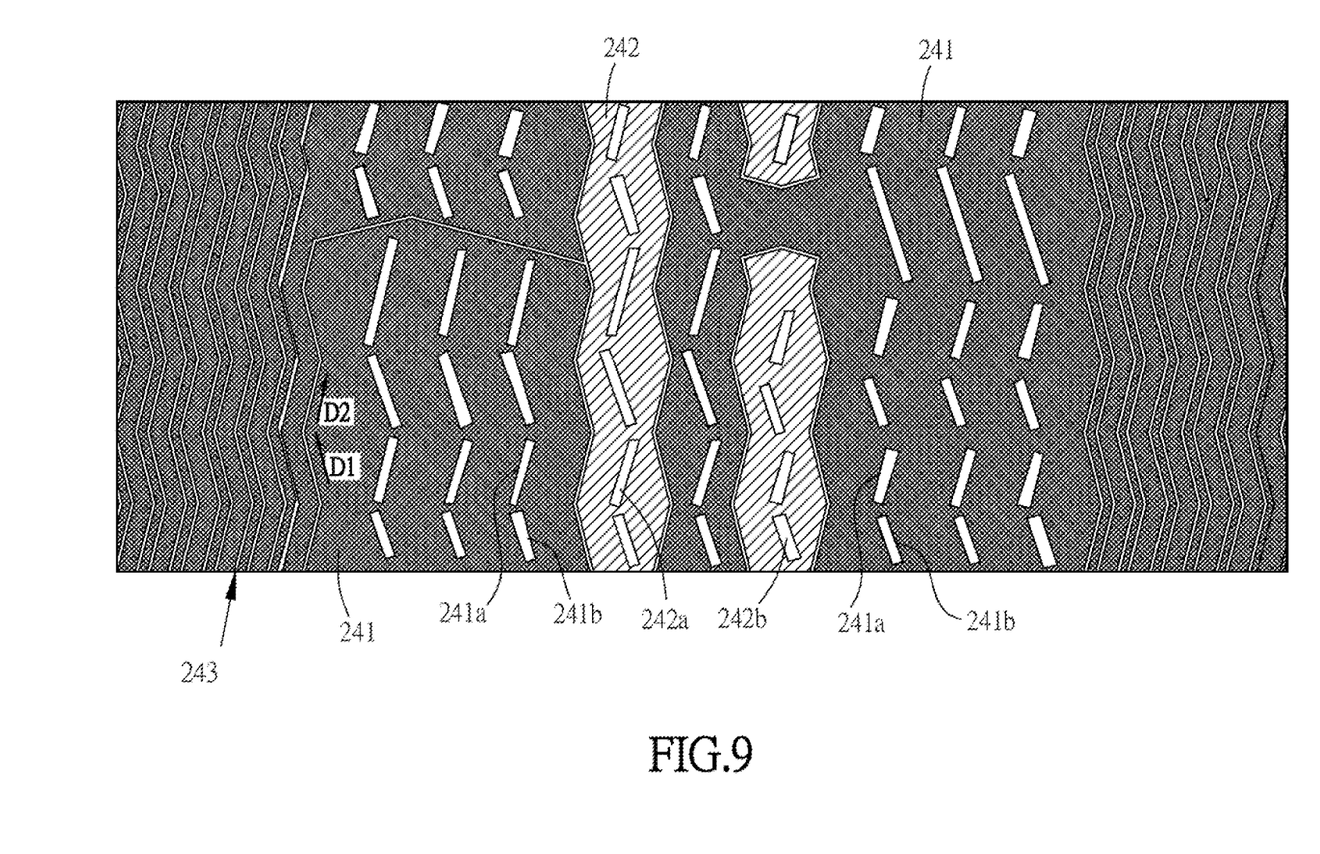
FIG. 9 is a schematic enlarged diagram of the sensing electrode layer of the sixth embodiment of the disclosure.

Then, refer to FIGS. 7 to 9. FIG. 7 is a schematic enlarged diagram of the sensing electrode layer of the fourth embodiment of the disclosure, FIG. 8 is a schematic enlarged diagram of the sensing electrode layer of the fifth embodiment of the disclosure, and FIG. 9 is a schematic enlarged diagram of the sensing electrode layer of the sixth embodiment of the disclosure.

The main difference from the above embodiment is that the second sensing electrode 242 in FIGS. 7 to 9 includes a plurality of second slits, which are extended along the first extending direction D1, the second extending direction D2 or the combination thereof.

In FIG. 7, the first slits 241*b* are extended along the first extending direction D1 and the second slits 242*a* are extended along the second extending direction D2. In other words, the second slits are arranged along the transverse rows, and the extending direction of some of the second slits 242*a* arranged along one of the transverse rows is different from that of some of the first slits 241*b* arranged along the one of the transverse rows. In FIG. 8, the first slits 241*b* and the second slits 242*b* are both extended along the first extending direction D1, and in other words, the extending direction of some of the second slits 242*a* arranged along one of the transverse rows is the same as that of some of the first slits 241*b* arranged along the one of the transverse rows. In FIG. 9, the first slits 241*a* and 241*b* are extended alternately along the first extending direction D1 and the second extending direction D2, and the second slits 242*a* and 242*b* are also extended alternately along the first extending direction D1 and the second extending direction D2, and the first slits 241*a* and 241*b* and the second slits 242*a* and 242*b* can form a zigzag pattern each. In other words, the first slits 241*a* arranged along the different transverse rows are extended alternately along the different extending directions, and the second slits 242*a* and 242*b* arranged along the different transverse rows are also extended alternately along the different extending directions.

These embodiments, different from the foregoing embodiments, dispose the second slits 242*a* on the second sensing electrodes 242 so as to further lower down the contrast of the brightness and darkness between the sensing electrode region (bright zone) and the circuit integration region (dark zone) of the touch display panel 2 to improve the display performance of the touch display panel 2.

As shown in FIG. 9, in this embodiment, favorably, the distance between the two adjacent first slits 241*a* arranged along one of the transverse rows is greater than that between the two adjacent wire segments arranged along the one of the transverse rows. If the distance between the first slits 241*a* is less than that between the wire segments of the wires 243, it may make an overhigh density of the first slits 241*a*. Therefore, the brightness of the sensing electrode region will be less than that of the circuit integration region and the RC loading will be generated. Therefore, the signal transmission is easy to be distorted and delayed and the display quality is thus reduced. Likewise, the distance between any two adjacent first slits 242*a* of the second sensing electrode 242 can be favorably greater than that between the two adjacent wire segments of the wires 243.

Since other configurations are similar to the above embodiments, the related illustrations are omitted here for conciseness.

Figure 10:
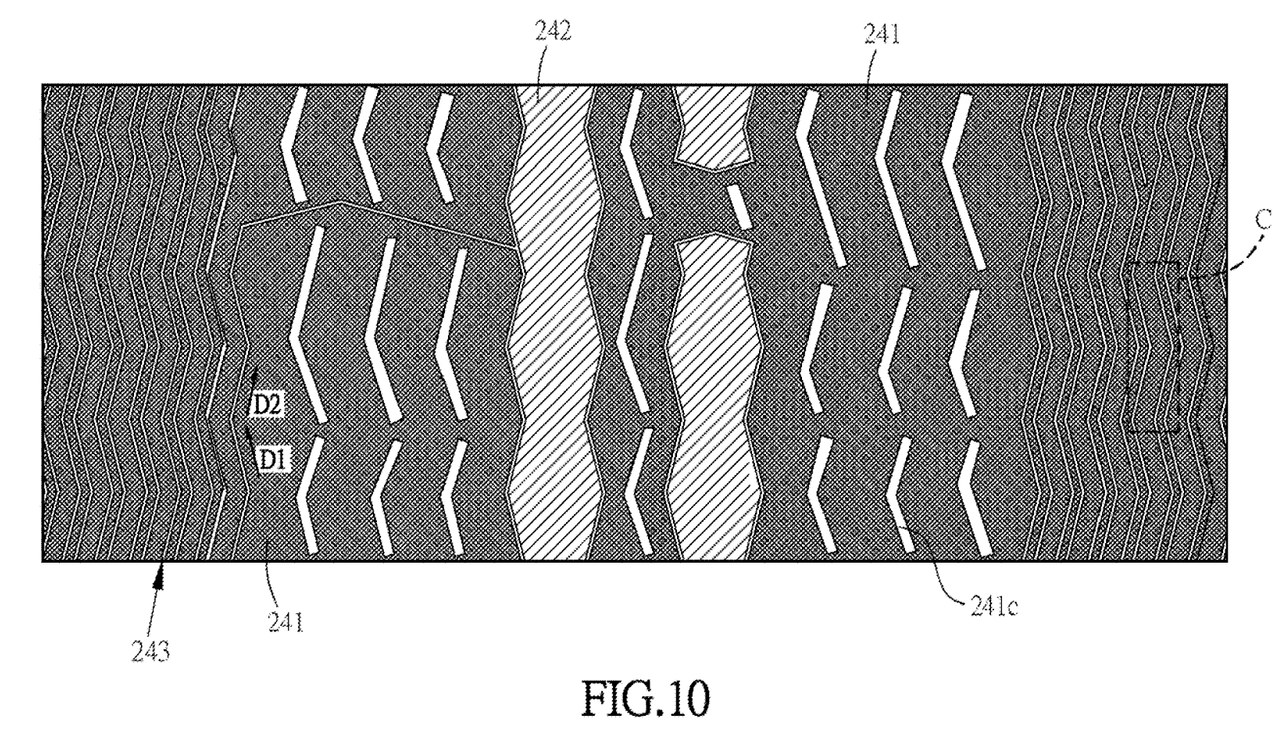
FIG. 10 is a schematic enlarged diagram of the sensing electrode of the seventh embodiment of the disclosure.
Figure 11:
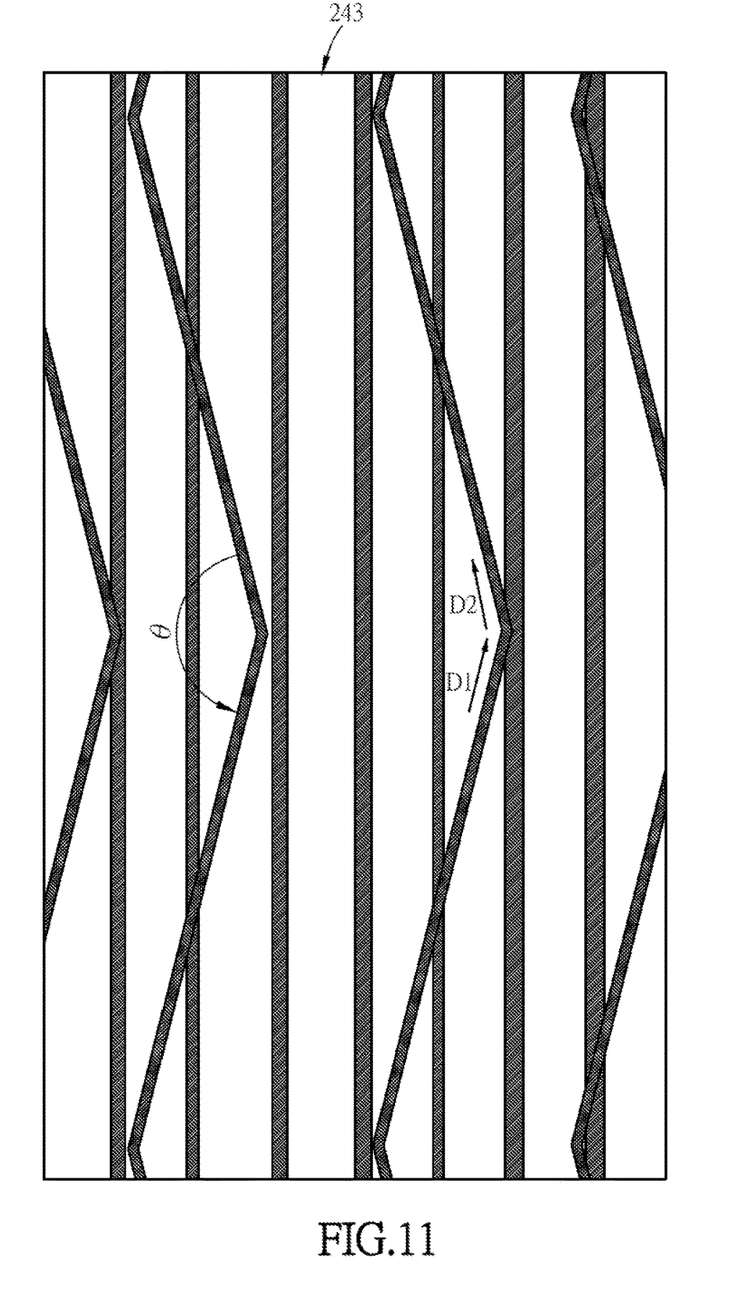
FIG. 11 is a schematic enlarged diagram of a part of the structure in FIG. 10.

FIG. 10 is a schematic enlarged diagram of the sensing electrode of the seventh embodiment of the disclosure, and FIG. 11 is a schematic enlarged diagram of a part of the structure in FIG. 10.

As shown in FIGS. 10 and 11, the main difference from the above embodiment is that this embodiment only disposes a plurality of first slits 241*c* on the first sensing electrode 241. Besides, in comparison with the above embodiment where the first slits 241*a* are unconnected, in this embodiment, the two adjacent first slits 241*c* arranged along the two different transverse rows and extended along the first extending direction D1 and the second extending direction D2 are connected with each other.

FIG. 11 is an enlarged diagram of the region C in FIG. 10. As shown in FIG. 11, the two adjacent wire segments connected with each other and respectively extended along the first extending direction D1 and the second extending direction D2 form an angle θ between 150° and 160°.

Through such configuration and adjustment of the angle θ, the wires 243 will evenly overlap partial red color filter film, green color filter film and blue color filter film of the color filter layer (not shown). In comparison with the conventional case where the wires are arranged parallelly (without bending portions), this embodiment is able to resist Moiré interference fringes.

Through above design, not only the Moiré effect resulted from the overlap between the sensing electrode layer 24 and the color filter layer can be resisted, but also the edges of the first sensing electrodes 241 and second sensing electrodes 242 can be blurred. Therefore, the influence of the edge notch on the user can be reduced and the whole visual effect can be thus enhanced.

The above first sensing electrodes 241, second sensing electrodes 242 and wires 243 can be formed by the same process so that the processing time and cost can be saved.

In one embodiment, the touch display panel 2 of this embodiment can further include a signal processing module (not shown), which is electrically connected with the sensing electrode layer 24 to receive the voltage variation signal generated by the second sensing electrode 242. In practice, the signal processing module can include a plurality of signal processing units, programmable logical units and signal conversion units to process the signal that is detected, sensed or transmitted by the sensing electrode layer 24. Moreover, the signal processing module is disposed on a printed circuit board (PCB) or a flexible printed circuit board (FPC) for example.

Summarily, in this disclosure, a plurality of first slits are formed on the first sensing electrode. Furthermore, some of the first slits on the same transverse row and the wire segments of some of the wires have different extending directions. Thereby, the contrast between the sensing electrode region (bright zone) and the circuit integration region (dark zone) of the touch display panel can be lowered down and the Moiré effect can be restrained. Therefore, this disclosure can provide a touch display panel whereby the display performance can be improved and the influence of the Moiré interference fringes can be reduced.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch display panel, comprising:
   a display module including a substrate; and
   a sensing electrode layer disposed on the substrate, the sensing electrode layer including:
   a plurality of first sensing electrodes arranged along a longitudinal direction;
   a second sensing electrode extended along the longitudinal direction and disposed beside the first sensing electrodes; and
   a plurality of wires electrically connected with the plurality of first sensing electrodes and the wire including a plurality of wire segments connected with each other and extended alternately along a first extending direction and a second extending direction,
   wherein the wire, the first sensing electrodes, the second sensing electrode are arranged in parallel on the same transverse row, the wire is narrower than each of the first sensing electrodes, and the wire is narrower than the second sensing electrode,
   wherein the first sensing electrode includes a plurality of first slits, the first slits are extended along the first extending direction, the second extending direction or the combination thereof,
   wherein some of the plurality of wire segments and some of the plurality of first slits are arranged along a transverse row, and the extending direction of some of the first slits arranged along the transverse row is different from that of some of the wire segments arranged along the transverse row,
   wherein the minimal distance between the two adjacent first slits arranged along the transverse row is greater than the minimal distance between the two adjacent wire segments arranged along the transverse row.

2. The touch display panel as recited in claim 1, wherein the extending direction of some of the first slits arranged along another one transverse row is the same as that of some of the wire segments arranged along the another one transverse row.

3. The touch display panel as recited in claim 1, wherein the first slits are arranged along a plurality of transverse rows, and the first slits arranged along different transverse rows are extended alternately along the first extending direction and the second extending direction.

4. The touch display panel as recited in claim 3, wherein the two adjacent first slits arranged along the two different transverse rows and extended along the first extending direction and the second extending direction are connected with each other.

5. The touch display panel as recited in claim 1, wherein the second sensing electrode includes a plurality of second slits, and the second slits are extended along the first extending direction, the second extending direction or the combination thereof.

6. The touch display panel as recited in claim 5, wherein some of the plurality of second slits are arranged along the transverse row, and the extending direction of some of the second slits arranged along the transverse row is different from that of some of the first slits arranged along the transverse row.

7. The touch display panel as recited in claim 5, wherein the plurality of second slits are arranged along a plurality of transverse rows, and the extending direction of some of the second slits arranged along the transverse row is the same as that of some of the first slits arranged along the transverse row.

8. The touch display panel as recited in claim 5, wherein the second slits are arranged along a plurality of transverse rows, and the second slits arranged along different transverse rows are extended alternately along the first extending direction and the second extending direction.

9. The touch display panel as recited in claim 1, wherein the two adjacent wire segments connected with each other and respectively extended along the first extending direction and the second extending direction form an angle between 150° and 160°.

* * * * *